United States Patent
Kfir et al.

(10) Patent No.: US 11,711,294 B2
(45) Date of Patent: Jul. 25, 2023

(54) FAST REROUTING USING EGRESS-PORT LOOPBACK

(71) Applicant: Mellanox Technologies TLV Ltd., Raanana (IL)

(72) Inventors: Aviv Kfir, Nili (IL); Barak Gafni, Sunnyvale, CA (US); Ilya Vershkov, Rishon Lezion (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/246,736

(22) Filed: May 3, 2021

(65) Prior Publication Data

US 2022/0353174 A1 Nov. 3, 2022

(51) Int. Cl.
- *G06F 9/48* (2006.01)
- *H04B 17/00* (2015.01)
- *H04L 45/24* (2022.01)
- *H04L 45/00* (2022.01)

(52) U.S. Cl.
CPC .............. *H04L 45/24* (2013.01); *H04L 45/22* (2013.01); *H04L 45/566* (2013.01)

(58) Field of Classification Search
None
See application file for complete search history.

(56) References Cited

U.S. PATENT DOCUMENTS

| | | |
|---|---|---|
| 7,586,841 B2 | 9/2009 | Vasseur |
| 8,072,879 B2 | 12/2011 | Vasseur et al. |
| 8,279,871 B1 * | 10/2012 | Sivan .................. H04L 12/4633 370/392 |
| 8,842,516 B2 | 9/2014 | Owens et al. |
| 9,160,652 B2 | 10/2015 | Taillon et al. |
| 9,954,769 B2 | 4/2018 | Ernstrom et al. |
| 10,644,985 B1 * | 5/2020 | Rathnamaiah .......... H04L 69/16 |
| 2003/0053474 A1 * | 3/2003 | Tuck, III ............. H04L 45/7453 370/422 |
| 2013/0322868 A1 * | 12/2013 | Wellbrock .......... H04J 14/0217 398/16 |
| 2014/0016476 A1 | 1/2014 | Dietz et al. |
| 2014/0169173 A1 * | 6/2014 | Naouri .................... H04L 47/10 370/237 |
| 2021/0176171 A1 * | 6/2021 | Frink .................... G06F 9/4887 |

OTHER PUBLICATIONS

Papan et al., "Tunnels in IP Fast Reroute," The 10th International Conference on Digital Technologies, pp. 270-274, year 2014.

* cited by examiner

*Primary Examiner* — Nicholas R Taylor
*Assistant Examiner* — Ho T Shiu
(74) *Attorney, Agent, or Firm* — Kligler & Associates Patent Attorneys Ltd

(57) ABSTRACT

A network device includes processing circuitry and multiple ports. The multiple ports are configured to connect to a communication network. The processing circuitry is configured to select a first port among the multiple ports to serve as an egress port for a packet, and to forward the packet to the first port, irrespective of whether or not the first port is usable as the egress port. The processing circuitry is further configured to, when the first port is usable as the egress port, transmit the packet to the communication network via the first port, and when the first port is unusable as the egress port, forward the packet from the first port to a second port among the multiple ports and transmit the packet to the communication network via the second port.

18 Claims, 2 Drawing Sheets

FAST REROUTING USING EGRESS-PORT LOOPBACK

TECHNICAL FIELD

Embodiments described herein relate generally to data communication, and particularly to methods and systems for fast rerouting in a communication network.

BACKGROUND

Fast rerouting is a technique for local recovery from a link or node failure. Methods for fast rerouting are known in the art. For example, U.S. Pat. No. 8,842,516 describes a multi-protocol label system (MPLS) carrying data, in which a working path carries data from a starting point or node to a destination point or node via a working path. The working path includes the switches and physical media linking starting point and the destination point. MPLS system reliability is enhanced by way of a protection path, over which data can be carried from the starting point to the destination point upon a detected failure along the working path. Upstream messages inform one or more MPLS switching systems to make a switchover from a working path to a protection path.

U.S. Pat. No. 9,954,769 describes a network device that is to be deployed in a network between a first network domain and a second network domain, and is to be configured for fast reroute. The network device includes a first traffic forwarder control module, corresponding to the first network domain, which is to determine a primary next hop in the first network domain. The control plane includes a second traffic forwarder control module, corresponding to the second network domain, which is to determine a backup next hop in the second network domain. The backup next hop is to be used as a fast reroute for the primary next hop in response to a failure associated with the primary next hop. The control plane includes a controller module, in communication with the first and second traffic forwarder control modules, which is to configure a forwarding structure of the forwarding plane with the primary and backup next hops.

SUMMARY

An embodiment that is described herein provides a network device that includes processing circuitry and multiple ports. The multiple ports are configured to connect to a communication network. The processing circuitry is configured to select a first port among the multiple ports to serve as an egress port for a packet, and to forward the packet to the first port, irrespective of whether or not the first port is usable as the egress port. The processing circuitry is further configured to, when the first port is usable as the egress port, transmit the packet to the communication network via the first port, and when the first port is unusable as the egress port, forward the packet from the first port to a second port among the multiple ports and transmit the packet to the communication network via the second port.

In some embodiments, the packet is addressed to a given destination address in a group of destination addresses that are reachable via the first port, and the processing circuitry is also configured to select the first port for the packet using a respective primary forwarding rule, and in response to detecting that the first port is unusable, to select the second port for the packet using a respective detour forwarding rule. In other embodiments, the processing circuitry is configured to forward the packet from the first port to the second port by sending the packet from the first port to an internal loopback path within the network device. In yet other embodiments, the processing circuitry includes a multiplexer that is configured to send the packet for transmission via the first port when the first port is usable, and to send the packet to the internal loopback path when the first port is unusable.

In an embodiment, the processing circuitry is configured to apply detour forwarding rules only to packets that were looped back from the first port to the internal loopback path. In another embodiment, the processing circuitry is configured to monitor usability status of the first port even when sending the packet to the second port. In yet another embodiment, the processing circuitry is configured to determine usability status of the first port by sensing a reception path within the first port.

In some embodiments, the processing circuitry is configured to transmit the packet via the second port by encapsulating the packet in a tunnel used for making a detour path, and transmitting the encapsulated packet via the second port. In other embodiments, a third port among the multiple ports supports looping packets back when the third port is unusable, and the processing circuitry is configured to forward packets that were looped back from the third port, toward the first port.

There is additionally provided, in accordance with an embodiment that is described herein, a method, including, in a network device that connects to a communication network using multiple ports, selecting a first port among the multiple ports to serve as an egress port for a packet. The packet is forwarded to the first port irrespective of whether or not the first port is usable as the egress port. When the first port is usable as the egress port, the packet is transmitted to the communication network via the first port. When the first port is unusable as the egress port, the packet is forwarded from the first port to a second port among the multiple ports, and transmitted to the communication network via the second port.

These and other embodiments will be more fully understood from the following detailed description of the embodiments thereof, taken together with the drawings in which:

DETAILED DESCRIPTION OF EMBODIMENTS

Overview

Figure 1:
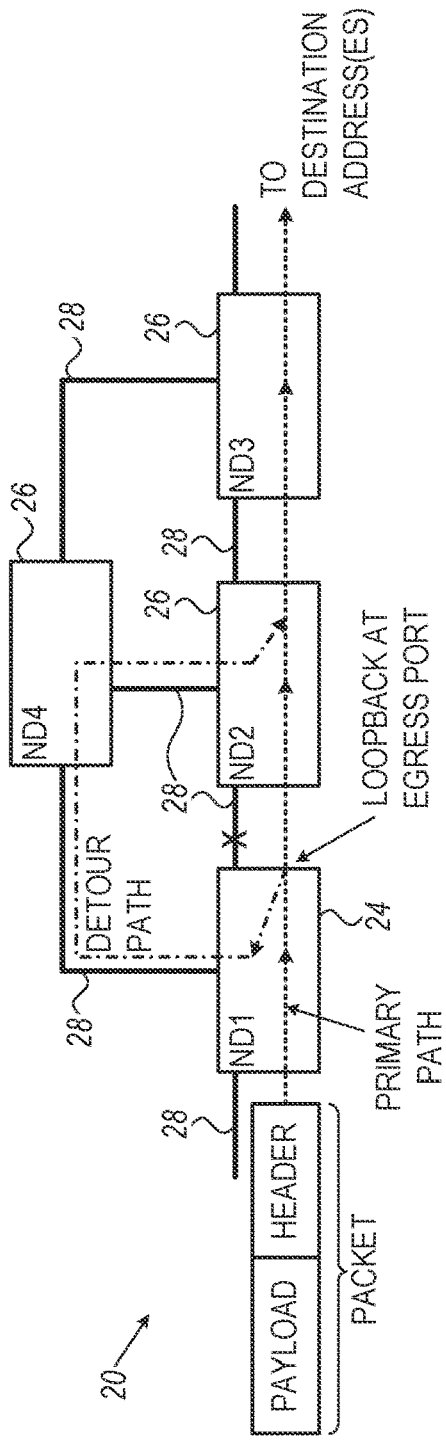
FIG. 1 is a block diagram that schematically illustrates a communication network that supports fast rerouting, in accordance with an embodiment that is described herein.

Embodiments that are described herein provide improved methods and system for fast rerouting in a communication network.

Various services that are provided over communication networks are sensitive to traffic loss that may cause significant degradation in the quality of service. For example, a voice over IP service can typically contend with a limited rate of packet loss. In fact, any service may provide a better user experience when communicated uninterrupted, e.g., video streaming and file transfer. Even when the network can recover from a failure, such recovery may take a long time, which has significant impact on the user experience. Also, slow recovery may cause upper network layers to fail due to timeout.

A communication network typically comprises multiple interconnected network devices, also referred to as "nodes." A network device may comprise, for example, a switch or a router. Some communication networks employ local Fast Rerouting (FRR) techniques to recover from a link or node failure. In FRR, upon detecting a failure, traffic is quickly redirected from a primary path to a predefined detour path that skips the point of failure. The detour path diverges from the primary path upstream from the point of failure, and merges back to the primary path downstream from the point of failure. A node that is connected immediately upstream from a protected link or node is referred to as a Point of Local Repair (PLR). A node at which a detour path merges back with the primary path is also referred to as a Merge Point (MP).

The packets traversing a primary path typically belong to multiple different flows. In principle, the PLR may preset, for each flow, a detour path to replace the primary path in case of a failure, and apply fast rerouting by separately handling each flow to be directed to a corresponding detour path. This solution, however, imposes a heavy burden on the PLR. Moreover, undesirably, the time it takes to switch all of the flows to detour paths upon failure, and back to the primary path upon failure recovery, increases with the number of flows.

In the disclosed embodiments, a node serving as a PLR initially forwards packets traversing the primary path toward an egress port connected to a next-hop node of the primary path. If the primary path is operative, the PLR transmits these packets via the egress port. Otherwise, the PLR loops the packets back from the egress port and forwards the packets to an egress port of a detour path. Looping the packets back does not require knowledge of the flows to which the packets belong. Consequently, switching to the detour path(s) is carried out efficiently to all flows, at a latency that does not dependent on the number of flows.

Consider a network device that comprises processing circuitry and multiple ports. The ports are configured to connect to a communication network. The processing circuitry is configured to select a first port among the ports to serve as an egress port for a packet, and to forward the packet to the first port, irrespective of whether or not the first port is usable as the egress port. The processing circuitry is further configured: when the first port is usable as the egress port, to transmit the packet to the communication network via the first port; and when the first port is unusable as the egress port, to forward the packet from the first port to a second port among the ports, and to transmit the packet to the communication network via the second port.

In some embodiments, the network device holds primary forwarding rules for forwarding packets to the primary path and different detour forwarding rules for forwarding packets to one or more detour paths.

In some embodiments, the packet is addressed to a given destination address in a group of destination addresses that are reachable via the first port, and the processing circuitry is also configured to select the first port for the packet using a respective primary forwarding rule, and in response to detecting that the first port is unusable, to select the second port for the packet using a respective detour forwarding rule.

In some embodiments, the processing circuitry forwards packets from the first port to the second port by sending the packets from the first port to an internal loopback path within the network device. In an embodiment, the processing circuitry comprises a multiplexer that is configured to send the packets for transmission via the first port when the first port is usable; and to send the packets to the internal loopback path when the first port is unusable. In an embodiment, the processing circuitry is configured to apply the detour forwarding rules only to packets that were looped back from the first port to the internal loopback path.

As noted above, the processing circuitry decides to loop the packets back from the first port based on a usability status of the first port. In some embodiments, the processing circuitry monitors the usability status of the first port even when sending the packets to the second port via the internal loopback path. This allows the processing circuitry to detect when the faulty link or node has recovered and resume forwarding the packets to the first port. In some embodiments, the processing circuitry is configured to determine the usability status of the first port by sensing a reception path within the first port.

In some embodiments, the network device protects a link or a node using tunneling techniques. In such embodiments, the processing circuitry transmits packets via the second port by encapsulating the packets in a tunnel used for making a detour path, and transmitting the encapsulated packets via the second port.

In an embodiment, a third port among the multiple ports supports looping packets back when the third port is unusable, and the processing circuitry is configured to forward packets that were looped back from the third port, toward the first port.

In the disclosed techniques, a network device forwards packets toward an egress port of a primary path regardless of the usability state of the egress port. When the egress port is unusable, the network device forwards the packets from the egress port of the primary path to a different egress port of a detour path. In the disclosed embodiments, the time of redirecting packets to the detour path and back to the primary path is very short and does not depend on the number of flows traversing the network device.

System Description

FIG. 1 is a block diagram that schematically illustrates a communication network 20 that supports fast rerouting, in accordance with an embodiment that is described herein.

Communication network 20 comprises multiple interconnected network devices, including a network device 24 (denoted ND1) configured as a Point of Local Repair (PLR), and other network devices 26 (denoted ND2 . . . ND4). Network devices 24 and 26 are also referred to herein as "nodes." Network devices 24 and 26 are interconnected using physical links 28.

The network devices in communication network 20 may comprise any suitable type of network devices such as, for example, routers, switches, or any other suitable type of a network device that forwards packets in communication network 20. Links 28 may comprise any suitable physical links such as copper-based links or optical-fiber links.

Communication network 20 may comprise any suitable communication network such as, for example, an Ethernet network or an InfiniBand™ (IB) fabric. Data may be delivered across the communication network using any suitable transport protocol. For example, in an Ethernet network the Transmission Control Protocol (TCP) or the Remote Direct Memory Access (RDMA) over Converged Ethernet (RoCE)

protocol can be used. In IB network, the RDMA message transport service can be used.

Communication network 20 may be used in various systems and applications, such as, for example, a data center network, a metro network, an enterprise network, and the like. Communication network 20 may be used in providing various services, such as, but not limited to, video streaming, telephony and file transfer.

Network device 24 (ND1) receives packets that belong to one or more different flows addressed to corresponding destination addresses via a network path referred to as a "primary path." In the present example the primary path comprises network devices ND1, ND2 and ND3. In the example configuration of FIG. 1, link 28 of the primary path between ND1 and ND2 is protected. This means that when this link fails (as denoted by the "X" symbol), ND1 quickly redirects packets forwarded to this link to a preassigned backup path via a different port. The backup path is also referred to herein as a "detour path." In the example of FIG. 1, the detour path diverges from ND1, passes through ND4, and merges back with the primary path via ND2. In this example ND2 serves as a Merge Point (MP).

As will be described in detail below, in some embodiments, ND1 redirects packets from the primary path to a detour path by looping the packets back at the egress port to which the faulty link connects. When the faulty link becomes usable again, ND1 resumes forwarding the packets along the primary path.

In the present context and in the claims, a port is considered "usable as an egress port" when traffic can be delivered reliably via the port to the next-hop network device of the primary path. The port is considered "unusable as an egress port" when traffic cannot be delivered reliably to the next-hop network device of the primary path, e.g., because the next-hop link or network device of the primary path is nonfunctional.

Although in the configuration of FIG. 1, a single link of the primary path (between ND1 and ND2) is protected, other suitable protection configurations of links and/or nodes can also be applied. For example, in an embodiment, ND2 can be protected by specifying a detour path that passes via ND4 and merges back with the primary path, e.g., via ND3 (not shown) or via a subsequent network device of the primary path.

In some embodiments, forwarding packets via the primary path and via the detour path is carried out using tunneling methods, e.g., using the Multiprotocol Label Switching (MPLS) protocol or other suitable protocols. In alternative embodiments, a technique referred to as a "Loop-Free Alternative" (LFA) path can also be used. In LFA, a router pre-selects an alternate neighbor capable of forwarding packets to the relevant destination in a loop-free manner. In using LFA, tunneling is not required, or may be required only in forwarding a packet at the beginning of a LFA path. Tunnels in IP Fast Routing (IPFRR) and example usage of the LFA method are described, for example, by Jozef Papan et al., in a paper entitled "Tunnels in IP Fast Reroute," The 10th International Conference on Digital Technologies 2014, 9-11 Jul. 2014.

In embodiments that employ tunneling, packets are encapsulated in a tunnel, e.g., for efficient forwarding. A packet may be encapsulated in a tunnel by ND1 or by a network device preceding ND1, e.g., by adding to the header of the packet a suitable tunnel header (e.g., an MPLS label). The tunnel is terminated at the MP node, by decapsulating the packet to remove the tunnel header. ND1 encapsulates a packet so that the packet will reach the MP node. It should be noted that ND1 performs packet encapsulation (for sending to the detour path) regardless of the format of the packet prior to encapsulation.

Implementing a Detour Path Using Egress-Port Loopback

Figure 2:
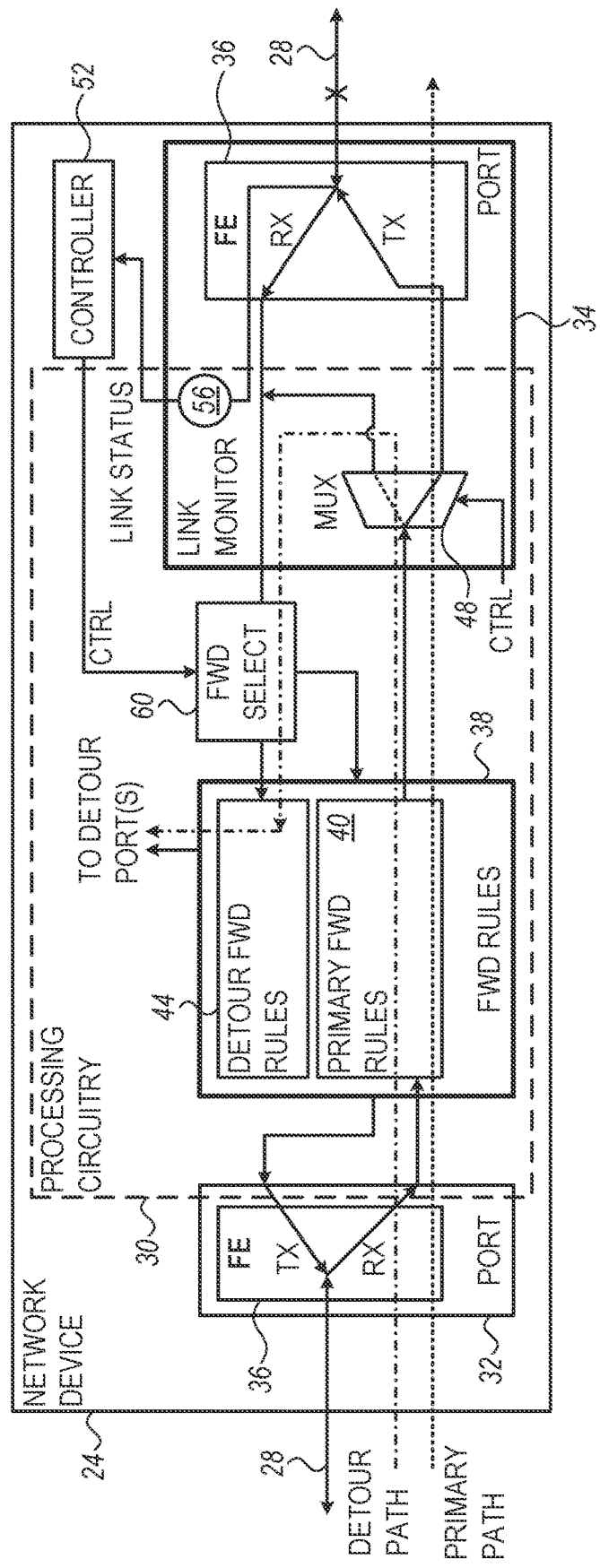
FIG. 2 is a block diagram that schematically illustrates a network device that handles fast rerouting using egress-port loopback, in accordance with an embodiment that is described herein.

FIG. 2 is a block diagram that schematically illustrates a network device 24 that handles fast rerouting using egress-port loopback, in accordance with an embodiment that is described herein.

Network device 24 comprises multiple ports for connecting to communication network 20. FIG. 2 depicts only two ports of the network device for the sake of figure clarity, numbered 32 and 34. Each of ports 32 and 34 serves both as an ingress port for receiving packets from the communication network and as an egress port for transmitting packets to the communication network. Each of ports 32 and 34 comprises a Front End (FE) 36 for interfacing to physical link 28 and for separating between the transmission (Tx) and reception (Rx) paths within the port.

Network device 24 comprises processing circuitry 30 that processes incoming and outgoing packets as will be described in detail below.

Processing circuitry 30 forwards packets received in the network device using forwarding rules 38 comprising primary forwarding rules 40 and detour forwarding rules 44, as will be described below. In some embodiments, the processing circuitry matches a packet to a corresponding forwarding rule, e.g., based on addressing and/or other information in the packet's header, and forwards the packet to a relevant port specified in the matched forwarding rule.

The forwarding rules may be implemented in any suitable way. For example, in some embodiments, the forwarding rules are implemented using a preconfigured forwarding table that maps indices derived from headers of the packets into corresponding egress ports. The processing circuitry may derive for a given packet an index to the forwarding table, e.g., by applying any suitable hash function to one or more fields in the header of the given packet. Alternatively or additionally, the forwarding rules may be based on metadata, such as an identity of the ingress port via which the packet has been received.

In some embodiments, primary forwarding rules 40 are used for forwarding packets received directly via an ingress port, and detour forwarding rules 44 are used for forwarding packets that were looped back from an egress port.

In the example of FIG. 2, ND1 uses the primary rules for forwarding to port 34 packets that were received via port 32 and that are addressed to the primary path. Such a packet will be matched to one of primary forwarding rules 40 that specifies forwarding the packet to port 34. In a typical configuration, packets belonging to multiple different flows are received via port 32 and forwarded using primary forwarding rules 40 to port 34 for traversing the primary path. More generally, packets received via multiple ingress ports may be forwarded using the primary forwarding rules to port 34.

Processing circuitry 30 comprises a multiplexer 48 associated in the present example with port 34. Multiplexer 48 is configured to receive packets that are forwarded to port 34.

The packets arriving at multiplexer 48 may be received via one or more ingress ports such as port 32 and forwarded using primary forwarding rules 40, and/or packets that were looped back by one or more egress ports other than port 34 and forwarded to port 34 using detour forwarding rules 44.

Multiplexer 48 forwards the packets for transmission via FE 36 of port 34, or to an internal loopback path, as will be described below.

In some embodiments, multiplexer 48 operates on serialized data. In other embodiments, the multiplexer receives and outputs parallel data, and the data is serialized after traversing the multiplexer. In the example of FIG. 2, multiplexer 48 resides within port 34. In alternative embodiments, however, multiplexer 48 may reside within processing circuitry 30 externally to port 34.

It should be noted that multiplexer 48 forwards to the internal loopback path packets belonging to multiple flows, regardless of any association between packets and corresponding flows. This solution is very efficient because when the link or node connected to port 34 fails, all the traffic to this port is redirected by the multiplexer automatically, without any need to handle different flows individually.

In the present example, multiplexer 48 is controlled by a controller 52 of the network device. Among other tasks, controller 52 receives link status indicative of the usability of port 34 as an egress port, and controls multiplexer 48 based on the usability of port 34. The usability status of a port is indicative of the health state of the link or next-hop node to which the port is coupled. In alternative embodiments, multiplexer 48 may be controlled using dedicated logic within the processing circuitry (not shown) instead of being controlled by controller 52. When port 34 is usable as an egress port, controller 52 controls multiplexer 48 to forward the packets for transmission via port 34. Alternatively, when port 34 is unusable as an egress port, the controller controls the multiplexer to loop the packets back to the internal loopback path.

Processing circuitry 30 comprises a link monitor 56, which is configured to monitor link 28 to which port 34 connects. In the example of FIG. 2, link monitor 56 resides within port 34, but in alternative embodiments, the link monitor may reside within the processing circuitry externally to port 34. In the example of FIG. 2, link monitor 56 senses the reception path (Rx) of port 34 to determine whether the link or the immediate downstream network device is operable or faulty. Alternatively, other suitable link monitoring configurations can also be used.

It should be noted that although link monitor 56 senses the reception path of port 34, the resulting link status is indicative of the usability of the port in both the reception and transmission directions, and can be used for determining whether the port can serve as an egress port.

In some embodiments, link monitor 56 is capable of monitoring link 28 of port 34 independently of whether multiplexer 48 is controlled to forward packets to FE 36 of port 34 or to the internal loopback path.

Processing circuitry 30 comprises a selector 60, which receives packets that were received directly via port 34 (in the ingress direction), or packets that were sent for transmission via FE 36 of port 34 and were looped back from port 34 by multiplexer 48, depending on the usability status of port 34, as described above. Controller 52 controls selector 60 to pass the packets for forwarding using primary forwarding rules 40 or using detour forwarding rules 44, depending on the usability status of port 34.

Selector 60 passes packets received from the communication network via port 34, for forwarding using primary forwarding rules 40. These packets are forwarded to ports of the network device specified by corresponding matching primary rules 40. Selector 60 passes packets that were looped back by multiplexer 48, for forwarding using detour forwarding rules 44. These packets are forwarded to respective one or more ports (other than port 34 of the primary path) specified by corresponding matching detour forwarding rules 44.

In some embodiments, packets that were looped back from port 34 are forwarded to a faulty detour path, i.e., the detour port (not shown) coupled to the detour path is also unusable. In such embodiments, the packets are looped back from the detour port (using a multiplexer associated with the detour port) and forwarded using the detour forwarding rules to another detour path.

As described above, network device 24 forwards all the packets that are received via port 32 and that are addressed to the primary path, to port 34. When port 34 is unusable as an egress port, the network device further forwards the packets from port 34 to a different port assigned to a detour path for that packet. It should be noted that network devices typically do not support forwarding of packets from one egress port to another egress port. In network device 24, however, such forwarding is supported by forwarding the packets to an internal loopback path. In the embodiment of FIG. 2, the internal loopback path comprises the relevant output port of multiplexer 48, selector 60 and detour forwarding rules 44.

The description of FIG. 2 refers to network device 24 (ND1) that serves as a PLR. The structure of other network devices in FIG. 2, such as ND2 . . . ND4, is typically similar to that of ND1. In ND2 . . . ND4, however, elements of ND1 that are specific to the PLR functionality may be omitted, such as, for example, detour forwarding rules 44, multiplexer 48 and selector 60.

The configurations of communication network 20 in FIG. 1 and of network device 24 in FIG. 2 are example configurations, which are chosen purely for the sake of conceptual clarity. In alternative embodiments, any other suitable communication network and network device configurations can also be used. The different elements of network device 24 may be implemented in hardware, such as using one or more Application-Specific Integrated Circuits (ASICs) or Field-Programmable Gate Arrays (FPGAs). In alternative embodiments, some elements of network device 24, e.g., processing circuitry 30 and/or controller 52, may be implemented in software executing on a suitable processor, or using a combination of hardware and software elements.

Elements that are not necessary for understanding the principles of the present application, such as various interfaces, addressing circuits, timing and sequencing circuits and debugging circuits, have been omitted from FIGS. 1 and 2 for clarity.

In some embodiments, processing circuitry 30 and/or controller 52 may comprise general-purpose processors, which are programmed in software to carry out the network manager and/or switch functions described herein. The software may be downloaded to the processors in electronic form, over a network, for example, or it may, alternatively or additionally, be provided and/or stored on non-transitory tangible media, such as magnetic, optical, or electronic memory.

In some embodiments, processing circuitry 30 comprises one or more elements that are serving ports. For example, in the network device of FIG. 2, multiplexer 48 and link monitor 56 of the processing circuitry serve port 34.

A Method for Fast Rerouting

Figure 3:
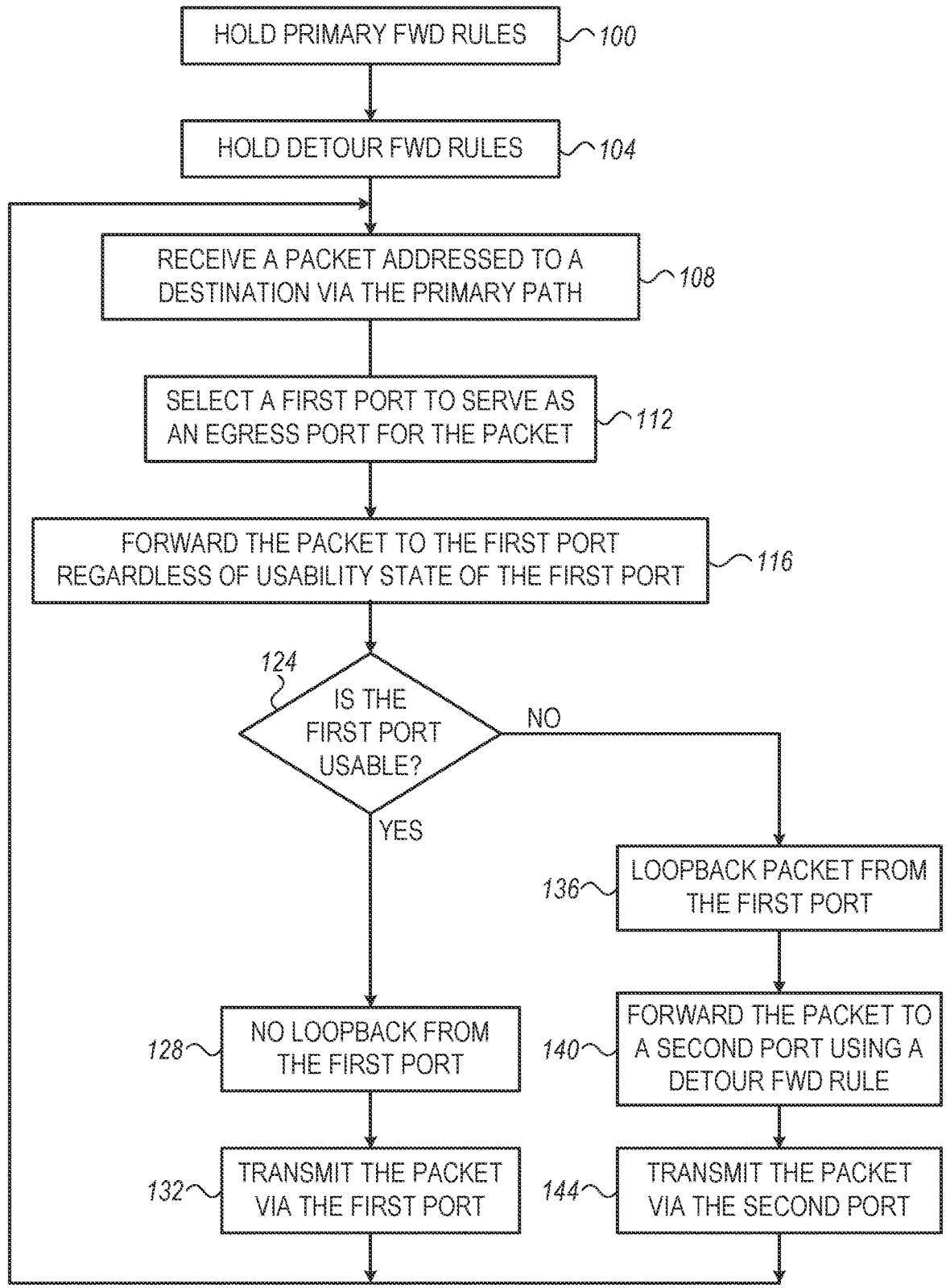
FIG. 3 is a flow chart that schematically illustrates a method for fast rerouting, in accordance with an embodiment that is described herein.

FIG. 3 is a flow chart that schematically illustrates a method for fast rerouting, in accordance with an embodiment that is described herein. The method will be described as executed by processing circuitry 30 of network device 24.

In performing the method of FIG. 3, it is assumed that link monitor 56 monitors the usability of port 34, e.g., as a background task, and provides the port usability status to the processing circuitry.

The method begins with processing circuitry 30 holding primary forwarding rules 40, at a primary forwarding rules setting step 100. In the example of FIG. 2 above, the primary forwarding rules are used in forwarding packets that were received directly via port 32 (and/or directly via other ports—not shown) and addressed to the primary path via port 34.

At a detour forwarding rules configuration step 104, the processing circuitry holds detour forwarding rules 44. The detour forwarding rules specify one or more ports of detour paths to which packets that are looped back from unusable ports are forwarded. In general, the capability of looping packets back may be implemented within multiple ports of the network device (rather just in port 34). In such embodiments, the detour forwarding rules specify one or more detour paths for each of the relevant ports.

At a reception step 108, the processing circuitry receives a packet that is addressed to a given destination address in a group of destination addresses that are reachable via port 34 of the primary path.

At a port selection step 112, the processing circuitry selects a first port (port 34 in the example of FIG. 2) to serve as an egress port for the received packet, e.g., by matching the received packet to one of primary forwarding rules 40. At a first forwarding step 116, the processing circuitry forwards the packet toward the first port selected at step 112. The processing circuitry forwards the packet toward the first port regardless of whether the first port is usable or unusable as an egress port.

At a port usability checking step 124, the processing circuitry checks the usability of the first port as an egress port, based on the link status reported by link monitor 56. When the processing circuitry detects at step 124 that the first port is usable, the processing circuitry configures multiplexer 48, at a no looping back step 128, not to loop the packet back, but to send the packet for transmission via the first port. At a primary transmission step 132, the processing circuitry transmits the packet sent from multiplexer 48 via the first port.

When at step 124 the processing circuitry detects that the first port is unusable, the processing circuitry loops the packet back from the first port to the internal loopback path, at a loopback step 136. At a second forwarding step 140, the processing circuitry passes the packet via multiplexer 48 and selector 60, and forwards the packet for transmission to a second port (different from the first port) using detour forwarding rules 44, as described above. In some embodiments, the processing circuitry is configured to apply the detour forwarding rules only to packets were looped back from the first port or from other unusable ports. At a detour transmission step 144, the processing circuitry transmits the packet via the second port. Following each of steps 132 and 144, the processing circuitry loops back to step 108 to receive a subsequent packet.

The embodiments described above are given by way of example, and other suitable embodiments can also be used.

The methods and systems described herein can be used in various applications, such as in any suitable packet network that provide any suitable packet-based service.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network device, comprising:
   multiple ports, to connect to a communication network; and
   processing circuitry to:
   store a set of forwarding rules comprising (i) primary rules that specify forwarding of packets from ingress ports to egress ports, and (ii) detour rules, different from the primary rules, the detour rules specifying forwarding of looped-back packets from unusable egress ports to alternative egress ports;
   select an egress port for a packet, among the multiple ports;
   forward the packet to the egress port using the primary rules, both when the egress port is usable and when the egress port is unusable;
   receive the packet at the egress port;
   check a usability status of the egress port; and
   using a multiplexer at the egress port, (i) transmit the packet to the communication network via the egress port when the egress port is usable, and (ii) when the egress port is unusable, forward the packet back from the unusable egress port to a second port among the multiple ports using the detour rules, and transmit the packet to the communication network via the second port.

2. The network device according to claim 1, wherein the packet is addressed to a given destination address in a group of destination addresses that are reachable via the egress port, and wherein the processing circuitry is also to:
   select the egress port for the packet using a respective primary rule; and
   in response to detecting that the egress port is unusable, select the second port for the packet using a respective detour rule.

3. The network device according to claim 1, wherein the processing circuitry is to forward the packet from the egress port to the second port by sending the packet from the egress port to an internal loopback path within the network device.

4. The network device according to claim 3, wherein the multiplexer is to receive an indication of whether the egress port is usable or not, and based on the indication, to send all packets that were forwarded to the egress port either (i) for transmission via the egress port when the egress port is usable, or (ii) to the internal loopback path when the egress port is unusable.

5. The network device according to claim 3, wherein the processing circuitry is to apply the detour rules only to packets that were looped back from the egress port to the internal loopback path.

6. The network device according to claim 1, wherein the processing circuitry is to check the usability status of the egress port even when sending packets back from the egress port via the multiplexer to the second port.

7. The network device according to claim 1, wherein the processing circuitry is to determine the usability status of the egress port by sensing a reception path within the egress port.

8. The network device according to claim 1, wherein the processing circuitry is to transmit the packet via the second port by encapsulating the packet in a tunnel used for making a detour path, and transmitting the encapsulated packet via the second port.

9. The network device according to claim 1, wherein a third port among the multiple ports supports looping packets back when the third port is unusable, and wherein the processing circuitry is to forward packets that were looped back from the third port, toward the egress port.

10. A method, comprising:
in a network device comprising multiple ports for connecting to a communication network, storing a set of forwarding rules comprising (i) primary rules that specify forwarding of packets from ingress ports to egress ports, and (ii) detour rules, different from the primary rules, the detour rules specifying forwarding of looped-back packets from unusable egress ports to alternative egress ports;
selecting an egress port for a packet, among the multiple ports;
forwarding the packet to the egress port using the primary rules, both when the egress port is usable and when the egress port is unusable;
receiving the packet at the egress port;
checking a usability status of the egress port; and
using a multiplexer at the egress port, (i) transmitting the packet to the communication network via the egress port when the egress port is usable, and (ii) when the egress port is unusable, forwarding the packet back from the unusable egress port to a second port among the multiple ports using the detour rules, and transmitting the packet to the communication network via the second port.

11. The method according to claim 10, wherein the packet is addressed to a given destination address in a group of destination addresses that are reachable via the egress port, and wherein the method further comprising:
selecting the egress port for the packet using a respective primary rule; and
in response to detecting that the egress port is unusable, selecting the second port for the packet using a respective detour rule.

12. The method according to claim 10, wherein forwarding the packet from the egress port to the second port comprises sending the packet from the egress port to an internal loopback path within the network device.

13. The method according to claim 12, and comprising receiving by the multiplexer an indication of whether the egress port is usable or not, and based on the indication sending, by the multiplexer, all packets that were forwarded to the egress port either (i) for transmission via the egress port when the egress port is usable, or (ii) to the internal loopback path when the egress port is unusable.

14. The method according to claim 12, and comprising applying the detour rules only to packets that were looped back from the egress port to the internal loopback path.

15. The method according to claim 10, and comprising checking the usability status of the egress port even when sending packets back from the egress port via the multiplexer to the second port.

16. The method according to claim 10, and comprising determining the usability status state of the egress port by sensing a reception path within the egress port.

17. The method according to claim 10, wherein transmitting the packet via the second port comprises encapsulating the packet in a tunnel used for making a detour path, and transmitting the encapsulated packet via the second port.

18. The method according to claim 10, wherein a third port among the multiple ports supports looping packets back when the third port is unusable, and comprising forwarding packets that were looped back from the third port, toward the egress port.

* * * * *